(12) United States Patent
Finlayson

(10) Patent No.: US 8,913,845 B2
(45) Date of Patent: Dec. 16, 2014

(54) METHOD AND SYSTEM FOR GENERATING OUTPUT IMAGE DATA

(75) Inventor: Graham D. Finlayson, Norfolk (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/696,540

(22) PCT Filed: May 6, 2011

(86) PCT No.: PCT/GB2011/050883
§ 371 (c)(1),
(2), (4) Date: Feb. 13, 2013

(87) PCT Pub. No.: WO2011/138617
PCT Pub. Date: Nov. 10, 2011

(65) Prior Publication Data
US 2013/0136378 A1    May 30, 2013

(30) Foreign Application Priority Data

May 6, 2010   (GB) .................................. 1007580.2

(51) Int. Cl.
*G06K 5/00*   (2006.01)
*G06T 5/00*   (2006.01)
(52) U.S. Cl.
CPC .......... *G06T 5/00* (2013.01); *G06T 2207/20016* (2013.01); *G06T 5/009* (2013.01)
USPC ...................................................... 382/279
(58) Field of Classification Search
None
See application file for complete search history.

(56) References Cited

U.S. PATENT DOCUMENTS

| 5,315,630 | A | 5/1994 | Sturm |
| 5,572,248 | A | 11/1996 | Allen |
| 7,463,393 | B2 * | 12/2008 | Shoda ........................... 358/518 |
| 7,643,180 | B2 | 1/2010 | Yamanaka |
| 8,035,870 | B2 * | 10/2011 | Shoda ........................... 358/518 |
| 2005/0019000 | A1 | 1/2005 | Lim |
| 2011/0052029 | A1 * | 3/2011 | Connah et al. ................ 382/131 |
| 2012/0263377 | A1 * | 10/2012 | Finlayson et al. ............ 382/162 |
| 2013/0051668 | A1 * | 2/2013 | Finlayson .................... 382/168 |
| 2013/0136378 | A1 * | 5/2013 | Finlayson .................... 382/279 |

FOREIGN PATENT DOCUMENTS

KR          403885 B1     4/2004
KR          504594 B1     8/2005

OTHER PUBLICATIONS

Elad et al. "Reduced complexity Retinex algorithm via the variational approach," 2003.*
Anonymous ECCV Submission 1489, "Surjective Gradient Field Reconstruction," 2008.*
Proof of date of publication of ECCV Submission 1489: ftp directory listing (ECCV Proof.pdf), 2008.*
Kazhdan et al. "Streaming Multigrid for Gradient-Domain Operations on Large Images," 2008.*

(Continued)

*Primary Examiner* — Vu Le
*Assistant Examiner* — Alexander J Lesnick
(74) *Attorney, Agent, or Firm* — Fish & Richardson P.C.

(57) ABSTRACT

A method of generating output image data comprises obtaining derivative data relating to a reference image; obtaining a constraint for output image data; and generating the output image data from the derivative data relating to the reference image in dependence on the constraint. This method can be used to recover a robust output image from the derivative of an input image.

35 Claims, 5 Drawing Sheets

(56) References Cited

OTHER PUBLICATIONS

Figure 1:
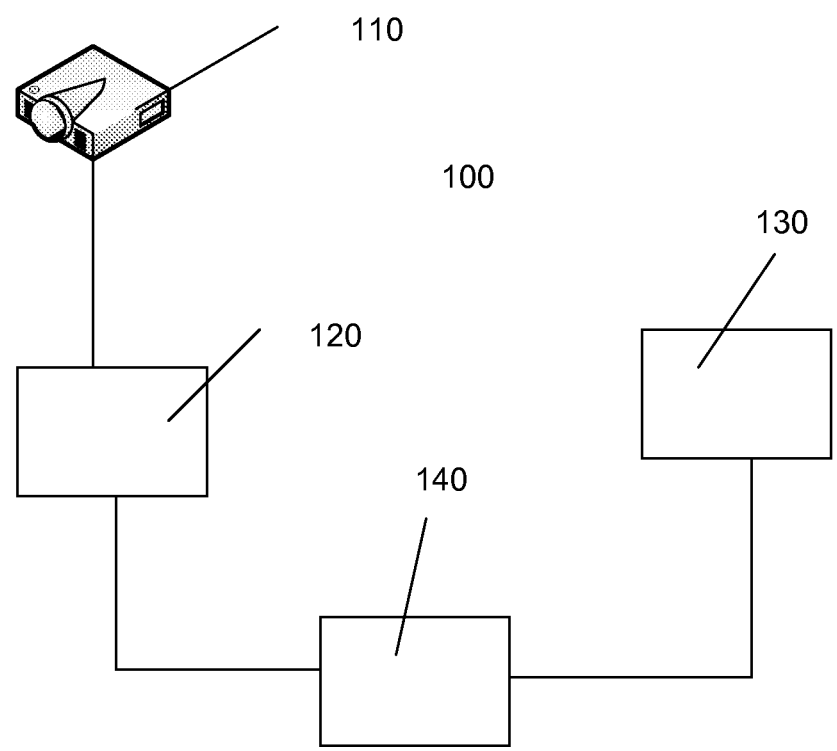

Bhat et al. "GradientShop: A Gradient-Domain Optimization Framework for Image and Video Filtering," 2010.*

Korean Notice of Preliminary Rejection (Non-Final) (with English translation) for Application No. 10-2012-7031985 dated Dec. 13, 2013, 10 pages.

Canadian Examiner's Report for Application No. 2,810,794 dated Sep. 16, 2014, 3 pages.

* cited by examiner

METHOD AND SYSTEM FOR GENERATING OUTPUT IMAGE DATA

CROSS-REFERENCE TO RELATED APPLICATIONS

This application is a National Stage application under 35 U.S.C. §371 of International Application No. PCT/GB2011/050883, having an International Filing Date of May 6, 2011, which claims the benefit of priority to United Kingdom Application Serial No. 1007580.2, filed May 6, 2010. The disclosure of the prior application is considered part of (and is incorporated by reference in) the disclosure of this application.

The present invention relates to methods and systems for generating output image data.

There are many places where we encounter systems of equations of the form $Ax \approx b$. Here the n×m matrix of numbers A is known as is the n×1 vector b and we seek to solve for the vector x that makes the approximation hold as closely as possible (in some sense). As a concrete example we may try and predict the monthly temperatures in 2006 as a linear combination of the monthly temperatures in the preceding 5 years. Here then A is 12×5 and b is 12×1 and we solve for the 5×1 vector x. There are many ways in which we might solve for x but in this context we are interested in robust solutions. Suppose, for example we have two systems of equations: $Ax \approx b$ and $Ay \approx b + \epsilon$. Here $\epsilon$ denotes a vector of very small numbers; that is, the two sets of equations are effectively the same. We would be surprised if when we solved for x and y their solutions were different from one another. Yet, if we solve equations naively this can in fact be the case. A robust solution strategy will return $x \approx y$.

According to an aspect of the invention, there is provided a method of generating output image data, comprising obtaining derivative data relating to a reference image; obtaining a constraint for output image data; and generating the output image data from the derivative data relating to the reference image in dependence on the constraint.

According to an aspect of the invention, there is provided an image processing system comprising a first component arranged to obtain derivative data relating to a reference image; a second component arranged to obtain a constraint for output image data; and a third component operable to receive the derivative data relating to the reference image from the first component and the constraint from the second component and to generate the output image data from the derivative data relating to the reference image in dependence on the constraint.

According to an aspect of the invention, there is provided a computer readable storage medium for storing machine-executable instructions, that, when executed by a processor, cause the processor to implement a method of generating output image data, comprising obtaining derivative data relating to a reference image; obtaining a constraint for output image data; and generating the output image data from the derivative data relating to the reference image in dependence on the constraint.

According to an aspect of the invention there is provided a method of recovering a robust output image from the derivatives of an input image.

In this description, the terms 'image' and 'image data' are used. In general, 'image' is used to refer to the image itself or data from which the visual image is rendered, describing it in a direct way, not for example describing a function or derivative of the image. 'Image data' can however refer to the image either directly or indirectly, it can for example refer to a function or derivative of the image.

According to an aspect of the invention, there is provided a method of treating an image comprising obtaining the derivatives of the image and then recovering a processed image therefrom. This method has the advantage of being able to produce a robust image.

In a preferred method, the mean of the processed or recovered image is set equal to the mean of the original image; this has the advantage of avoiding the problem caused by an unknown constant of integration.

According to an aspect of the invention, there is provided apparatus for treating an image comprising means for obtaining the derivatives of the image and means for recovering a processed image from the derivatives.

Preferably, a robust version of the reference image is recovered from a derivative of the reference image to form an output image.

Although the description relates in general to the generation or processing of images, aspects of the invention are also applicable to any form of input signal for example audio signals.

Derivatives of any order can be used in embodiments of the invention.

The magnitude of the function of the output image data can be calculated by the root-mean-square measure or from the difference between the maximum and minimum output image value.

Figure 2A:
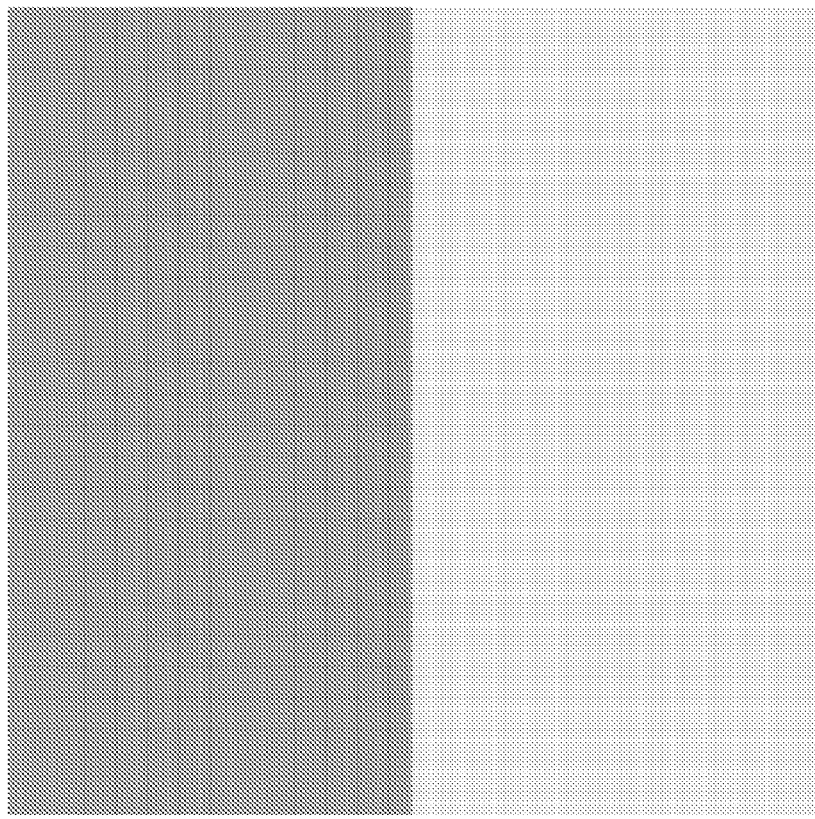
Figure 2:
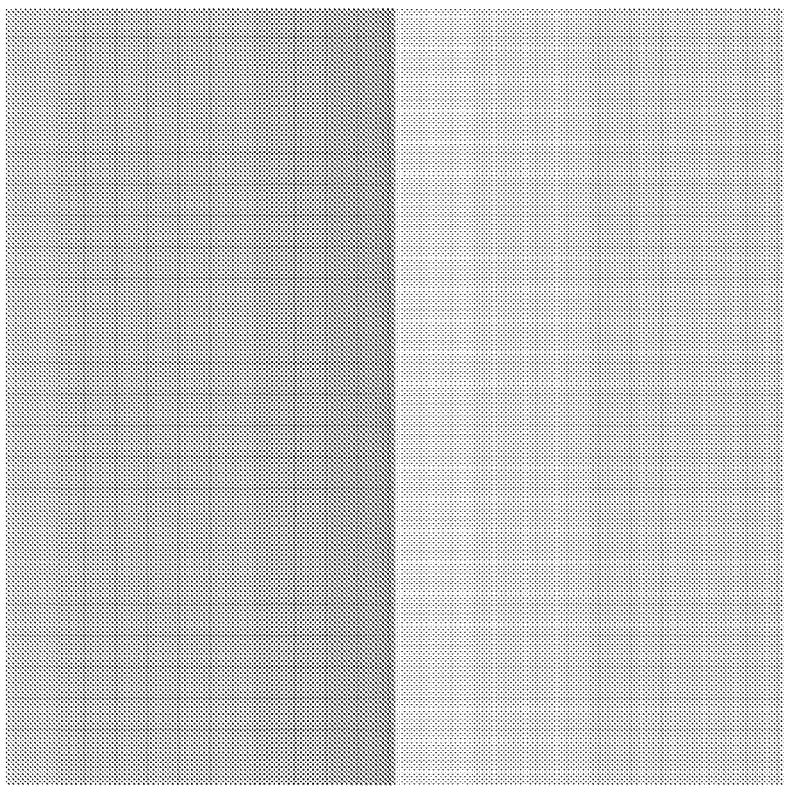
Figure 2:
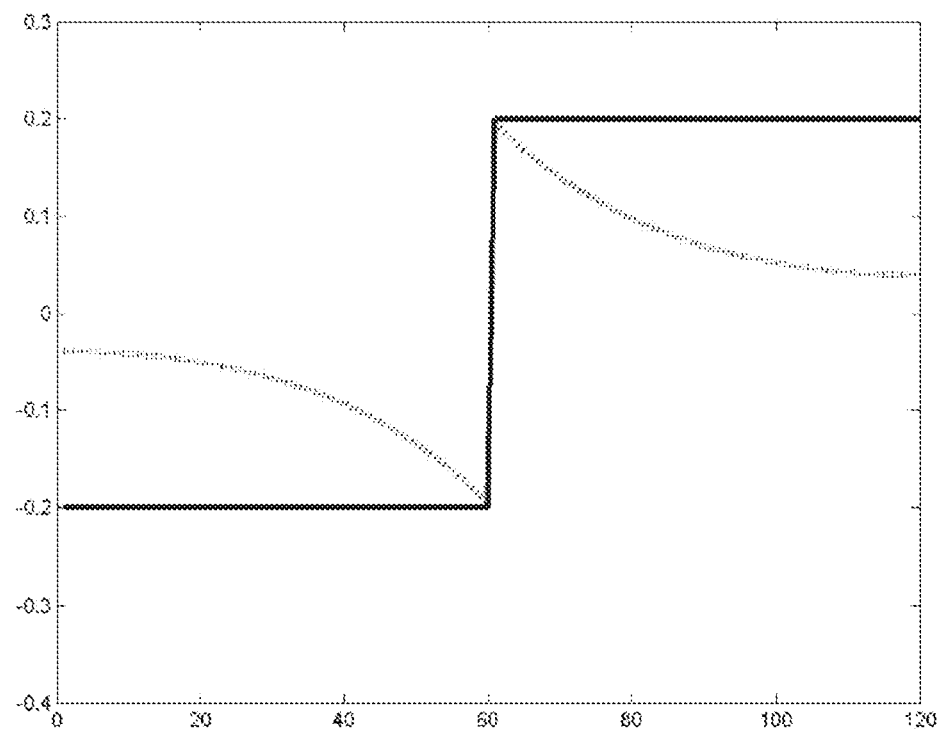
Figure 3:
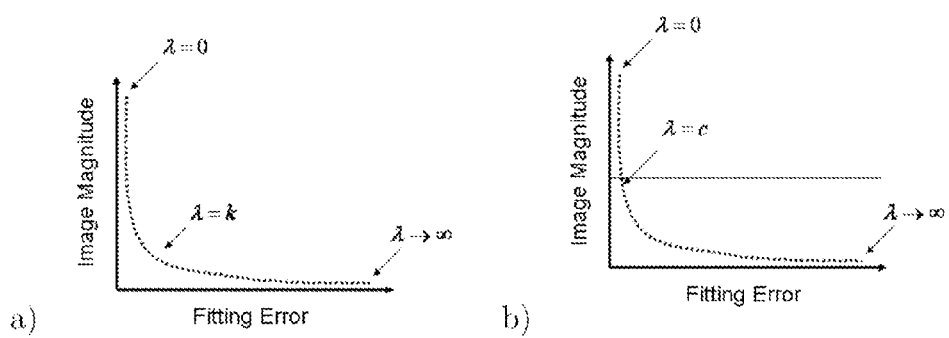
Figure 4:
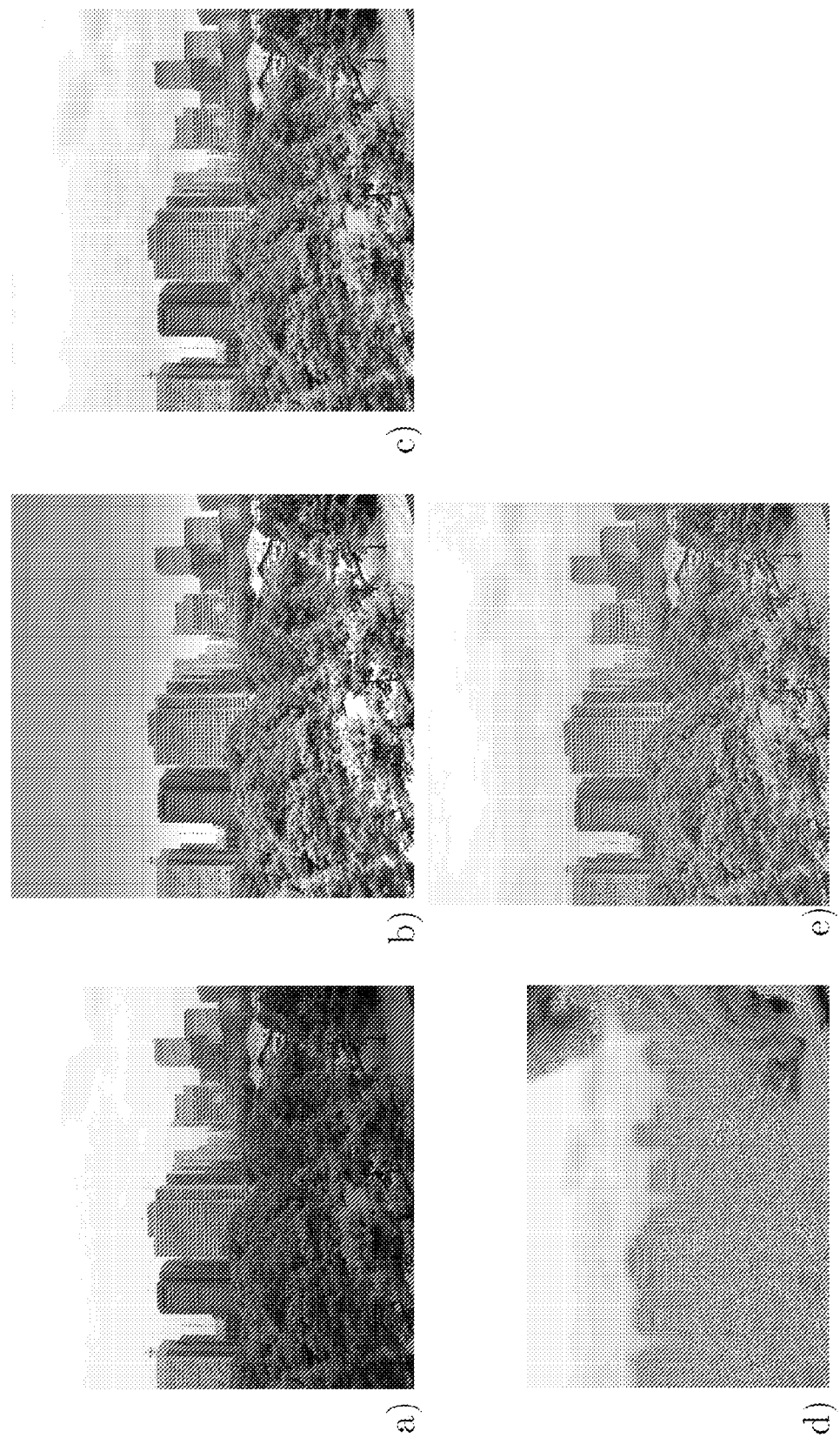

Preferred embodiments will now be described, by way of example only, with reference to the accompanying drawings, in which:

FIG. 1 is a schematic diagram of a system according to an embodiment of the invention;

FIG. 2: a) is an original image, b) is the image after one application of robust method according to an embodiment of the invention and d) is the image after two applications. 2c) compares original intensities with 2b) (cross section of image) and 2e) shows brightnesses for single and double application FIG. 3 is two graphs of fitting errors against image magnitude for embodiments of the invention; and FIG. 4: a) is an original image, b) is a robust counterpart, c) is a robust counterpart where the effect is dampened, d) is a robust image for larger λ and e) is an average of c) and d)

FIG. 1 is a schematic diagram of a system 100 for generating output image data relating to an image of a desired robustness.

In the embodiment depicted, the system 100 is an image compression system, although the system can be used to generate an image of a desired robustness for other applications such as those described below.

An image capture device 110 is in this embodiment a digital camera operable to capture an image of a scene. A first component 120 is operable to obtain data relating to a reference image captured by the image capture device 110. However, first component 120 can alternatively obtain image data relating to a reference image by other means, such as from data storage.

In this embodiment, the first component 120 is operable to generate derivative data relating to the reference image. However, in other embodiments, the data relating to the reference image received by the first component 120 is derivative data relating to the reference image.

The first component 120 may be operable to apply a function to the derivative data relating to the reference image, such as a threshold or clip to zero function.

A second component 130 is operable to obtain a regularisation constraint in dependence on which output image data will be generated.

In the embodiment depicted, the constraint comprises a requirement to minimise the sum of: a difference between a derivative of the output image data and the derivative data for the reference image; and a positive penalty term. The possible constraints are described in more detail below.

A third component 140 obtains the derivative data for the reference image from the first component 120 and the regularisation constraint from the second component 130 and generates output image data from the derivative data relating to the reference image in dependence on the constraint.

In the embodiment depicted, the output image represented by the output image data is a robust image in which the dynamic range is compressed owing to the positive penalty term in the regularisation constraint. As explained above, if derivatives are taken of the output image and then slightly changed, they still integrate to an image close to the output image. Therefore the output image is referred to as being robust. However, the detail of the reference image is not lost and can be recovered by using the output image as a reference image for the system 100 but using an appropriate negative penalty term in the regularisation constraint. This can make the image less robust and expand the compressed dynamic range.

The third component 140 may also be operable to apply to the output image data the inverse of the function applied to the derivative data relating to the reference image by the first component 120.

Of course, the first, second and third components 120, 130 and 140 do not need to be separate physical components, but can be a single component such as a suitably programmed processor.

In addition, as explained above, the system is not limited to the image compression application described but can be used for many other applications for which images of a predetermined robustness are desired. For many of these, different regularisation constraints are employed, and these are discussed in detail below.

To understand our approach it is useful to examine a little further how we solve systems of equations. Suppose we have an n×2 matrix $A=[b \; \epsilon_1]$ and we are trying to solve $Ax \approx b+\epsilon_2$. Remembering that $\epsilon$ denotes a vector of very small numbers, it is clear that a good solution would be $x=[1 \; 0]^t$. But, equally, $x=[1 \; 10000]^t$ is possible assuming $10000 \; \epsilon_1 \approx 0$. How might we discriminate between the two solutions? Well, arguably, $x=[1 \; 0]^t$ is simpler than $x=[1 \; 10000]^t$ because the 2nd coefficient is smaller (0 as opposed to 10000). Indeed, we might say that a good solution to a system of equations has the property that $\|Ax \approx b\|$ and $\|x\|$ is small (where $\|.\|$ is some measure of magnitude e.g. the square root of the sum of squares). Mathematically, we can find such a solution by minimizing:

$$I=\|Ax-b\|+\lambda\|x\| \quad (1)$$

where λ is a user defined penalty scalar. With respect to our example clearly the solution $x=[1 \; 0]^t$ would be preferred.

So, how does this preamble help us in thinking about robust images? Well, suppose we have an image J(x, y) which we represent as a vector Q: the image J stretched out as a long vector of numbers. Let q denote the x and y derivatives associated with Q. It is well known that the derivatives of an image are a dual representation of the image itself [7]: given the image derivatives we can recover the image by integration (up to a single unknown constant of integration). To consider these ideas further let us write differentiation as a matrix equation:

$$DQ=q \quad (2)$$

The x-derivative for an image J at location (i,j) can be written as J(i+1,j)−J(i, j). Similarly they derivative is equal to J(i,j+1)−J(i,j). If J is n×m then Q is a nm vector of numbers. The differential operator matrix D is a 2 nm×nm matrix (2 nm rows because there is an x and y derivative per pixel). A given row of D is all 0s except two entries which are 1 and −1 (if J(i+1,j) and J(i,j+1) are mapped to the uth and with rows of Q then we place 1 at column u and −1 at column v To solve (2) we might, naively and wrongly as it turns out, write:

$$Q=D^{-1}q \quad (3)$$

Wrongly, because the differential operator matrix is both non-square (by definition non invertible) and rank deficient. We can make it full rank (nm dimensional) by taking care to specify what happens at the boundary of the image when we calculate the derivative image. For example we might assume that outside the boundary of the image the image signal is 0 (effectively we pad the original images with 0s). This is one example of Dirichlet boundary conditions (we assume we know what is outside the image). Alternately, we could assume homogeneous Neumann boundary conditions: that the derivatives at the edge of the image are 0. But, we still cannot invert D directly (it's still not square). Rather we solve for Q in a least-squares sense:

$$Q=D^+q=Q=[D^tD]^{-1}D^tq \quad (4)$$

where $D^+$ is the pseudo-inverse [3] (sometimes called the Moore-Penrose inverse). Clearly, substituting DQ for q in (4) leads to the conclusion that Q=Q (i.e. we correctly reintegrate the derivatives to recover the image we started with: we have shown the duality of images and their derivatives).

Consider now that we are given the equations: $DQ_1 \approx q$ and $DQ_2 \approx q+\epsilon$. Clearly, given similar derivatives we would like $Q_1 \approx Q_2$. One way to achieve this is to minimize the error in the expression:

$$\mathrm{Err}=\|DR-q\|+\lambda\|R\| \quad (5)$$

that is, given the derivatives q we recover the image R whose magnitude is bounded in some sense (the larger the penalty term λ the smaller the magnitude of the recovered image just like in Equation 1). We say that an image that is recovered (from its own derivatives) in this way is robust. This is a useful advantage provided by embodiments of the invention. We remark here that the idea of regularisation to recover an image with desirable properties is not wholly new. Hurlbert [6] formulated lightness recovery (the separation of reflectance and illumination) as a regularisation problem. Here though a minimization is solved for relating an input image to a related image with a desired property (in Hurlbert's thesis an image with, say, an intensity gradient is related to a counterpart with the gradient removed). In embodiments of the invention, we are not given this 'right-hand' part of the solution (it is not a classical regression). Also, in Hurlbert's method, the central error function was minimising error in the primal (non-derivative) domain.

The solution to (5) is equal to $$R=[D^tD+\lambda I]^{-1}D^tq \quad (6)$$

Where I denotes the nm×nm identity matrix. Nothing that q=DQ, we rewrite (6) as:

$$R=[D^tD+\lambda I]^{-1}D^tDQ \quad (7)$$

It is worth making a few remarks about (7). First, unlike in (4), the derivative of the recovered image is not in general equal to the starting derivatives: DR≠q. But this is what we want: input images which are often not robust, are transformed to be robust by Equation 6. Second, because the identity matrix I is involved in the matrix inverse it is clear that $[D^tD+\lambda I]^{-1}$ is always invertible. This remains true even when we are lax about the boundary conditions. This is quite an important point. It means for example we can also replace the derivative operations in D with second, third (or indeed any order or combination of orders) of derivatives and we still have a well formed minimisation. That we can recover an image from its derivatives without making strong boundary assumptions and that we can work with derivatives of any order are two advantages of embodiments of the invention. Equation (7) can be solved using standard matrix inverse techniques including Jacobi iteration and the Gauss-Seidel method [8].

Under certain conditions (e.g. assuming homogeneous Neumann boundary conditions), the matrix calculation of (7) can be written as a convolution operator. With respect to Homogeneous Neumann boundary conditions, it can be shown that for a given $\lambda$, the result of (7) can be approximated as:

$$\int_{-\infty}^{\infty}\int_{-\infty}^{\infty}(k-mJ(x-u,y-v)\exp(-r\sqrt{u^2+v^2})du\,dv \quad (8)$$

where k is a constant less than but close to 1, m makes the area under the inverse exponential sum to less than but close 1 and r controls the shape (peakedness) of the inverse exponential. As $\lambda$ increases so k, m and r decrease. Formulated as a convolution calculating a robust image can be calculated quickly (e.g. by carrying out the convolution in the Fourier domain [4]). Further speed-ups could be obtained by approximating filter by one that is separable [4] (so the rows and columns are successively convolved with 1-dimensional convolution filters).

We can generalise further by allowing the input image to be transformed by a homomorphic function $f(\ )$ and for the derivatives of Q to be transformed by a function $T(\ )$:

$$R=f^{-1}([D'D+\lambda J]^{-1}D'T(Df(Q))) \quad (9)$$

Here $f(\ )$ could be, for example, the logarithm function. In this case we would take logs before we differentiate and then exponentiate $f^{-1}(\ )$ as the final step in making the robust images. Often derivative manipulation is carried out in log space as the relative difference between pixels tends to be perceptually more significant [9]. The function T might be a threshold function e.g. if the absolute value of a derivative is very large $T(\ )$ might attenuate its value. Equally, if a derivative is close to 0, $T(\ )$ might set the derivative to 0. Both the attenuating and clip to zero examples are found in the image enhancement literature [1]. The general form of (9) is covered by embodiments of the invention.

We illustrate an embodiment of the invention in FIG. 2: FIG. 2a) shows a step edge image, FIG. 2b) shows the image recovered using Equation (6). The reader, should try and view (2b) through a small aperture to achieve the best perceptual affect. Viewed in the right circumstances, the magnitude of (2b) should look similar to (2a). This is surprising since the grey-scale values at the left and right edges respectively are almost the same. In FIG. 2c) we contrast the edge profile of the two edges. To arrive at these figures we carried out a common image processing workflow. First, intensity values are in the range 0 to 1. Because we have an unknown constant of integration when we recover Q we set the mean of the recovered image equal to the mean of the original. The plot in FIG. 2c) is centred around 0 (this is before we add back the constant of integration): it is clear that the magnitude of the robust image is less than the original which is what we would expect. That the curved intensity profile of (2c) is perceived as similar to the original step edge is well known to psychophysicists. Indeed this effect is called the Craik-Cornsweet illusion [9]. What is remarkable here is that we have produced this illusion using a simple, well founded robust mathematical argument.

Figure 2D:
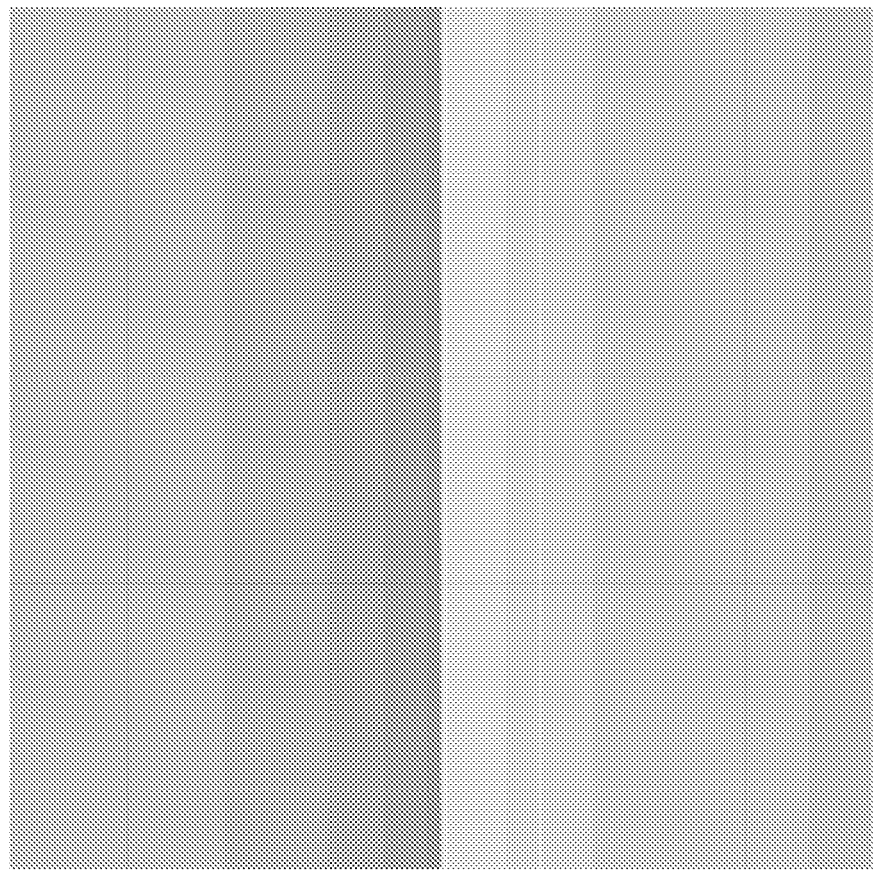
Figure 2E:
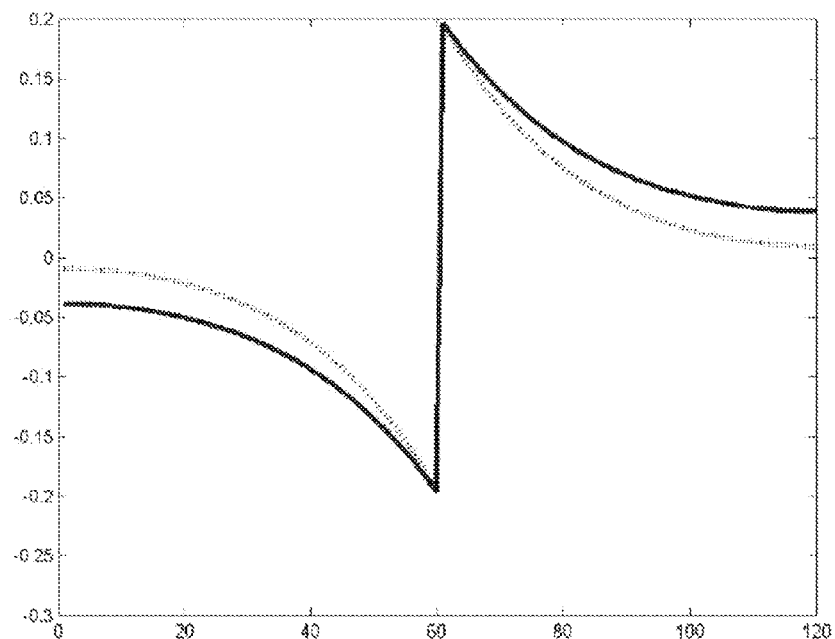

In FIG. 2d) we show the image that results in applying (6) to (2c). In effect we are solving for $Q_1$ where $Q_0$ is the original robust image:

$$I=\|DQ_1-DQ_0\|+\|Q_1\| \quad (10)$$

Of course if (2c) is a robust image we do not expect its robust counterpart to be much different. Indeed, this is so, FIG. 2d) shows a second application of the robust procedure. In (2e) we compare an intensity profile of a single and double application of the robust algorithm. It is clear that once an image is robust it stays robust.

Significantly, there are methods for choosing the penalty term $\lambda$ automatically. For example, it is clear that as $\lambda \to 0$ the minimum least-squares answer, $\min_R \|DR-DQ\|$, is returned and as $\lambda \to 0$ the magnitude of the recovered image becomes larger. Plotting recovery error against the magnitude of the recovered image results in an L-shaped curve. In FIG. 3a) we show an example L-curve for many different choices of $\lambda$. In regularisation theory $\lambda$ is often chosen so that the magnitude of the recovered vector (in our case image) is small as well as there being a small fitting error e.g. $\lambda=k[5]$.

As shown in FIG. 3(a), choosing $\lambda=k$ returns an image which has a small magnitude and a small fitting error. With respect to the application of Dynamic range compression (FIG. 3(b)), we could set $\lambda=c$ so that the image magnitude is within a target dynamic range.

The equation shown in (1) is an example of regularisation theory [5]. The quantity $\lambda\|Q\|$ is a penalty term or regularisation term. In fact there are many other ways we can regularise systems of equations. We could for example demand that the recovered image is, in some sense smooth, or that the recovered robust image is close, in some sense to the original. Indeed many regularisations can be considered by generalising the penalty term. Let us write a general penalty term as:

$$\lambda\|g(Q)\|_p \quad (11)$$

where p is the Minkowski p norm. If p=2 then the sum of squares is calculated (as the penalty). The function $g(\ )$ can be a fairly arbitrary function. For example in recovering an image it may be important to minimise some non linear function of image norm (e.g. to approximate perceptual quantities). Any regulariser of the form covered by (11) can be used in embodiments of the invention. There are other ways of bounding the norm of the recovered image. We could for example demand that the recovered image is a linear combination of a small set of smooth functions (e.g. first M terms of a discrete cosine basis). Though, in this case the robust image will be smooth. There are many varieties of regularisers, the list is too numerous to enumerate. Suffice to say that each provides a means to encourage robust solutions. Embodiments of the invention include the following regularisation workflow:
1. $K=f(J)$ ($f(\ )$ is a homomorphic transform, J is the starting image)
2. $q=T(DK)$ (q is some derivative, D or combination of derivatives to some order. D might describe a given linear operator or a computer program. T is an operator on the derivatives (such a threshold).
3. Recover R from q subject to some regularisation constraint
4. $O=f^{-1}(R)$ undo the homomorphic transform.

With respect to the present invention, a useful advantage is that an image can be regularised (made robust) with respect to itself. Normally, we are given the equations A and the regression vector b and we then solve for x. Here we know that we are interested in a differential operator D but we calculate $q=DQ$ from the original image. The recovered image R is not equal to the original because of the penalty term. The whole of standard regularisation theory can be applied to make images robust once one realises (invents) the idea that an image and its derivative can be written as a system of equations to be solved.

The idea clearly extends to scenarios where an image is decomposed into different scales. For example, smoothing an image with a given Gaussian filter tends to suppress small details but the presence of large edges remains. We could also make this smoothed image robust according to embodiments of the invention. Often different image scales are ordered in a pyramid e.g. in the Gaussian pyramid each level contains the image blurred by a Gaussian that has twice the standard deviation of the one previously used. Thus at the top level we have the original image, then we convolve with a 1 pixel standard deviation Gaussian, then with standard deviations 2, 4, 8, 16, 32 etc. At the bottom level we store the global average of the image. Storing the differences between successive layers we calculate the so-called Laplacian pyramid [2]. The Gaussian at level k can be predicted from the Gaussian at k−1 and the difference at level k. Storing only the differences between different blur levels provides an efficient means to code the original image. In embodiments of the invention we can store the difference of robust images at different scales. An alternate way of calculating robust images at different scales would be to calculate a series of operators with different penalty terms $\lambda$. If $\lambda$ is small then only the largest edges in the image will be attenuated. As $\lambda$ becomes large the magnitude of smaller edges are also important and so these will be made smaller.

Robust images have many applications in computer vision and image processing. An example of the application of bringing out image detail, is shown in FIG. 4). Here we have an original image where details are not apparent in the shadows or highlights. This large difference between bright and dark images is an example of non-robustness. Applying the method according to an embodiment of the invention yields the image in 4b. Clearly we can better see all the details. The image does however look a little unnatural (the sky has become too dark). In 4c we dampen the process of making the image robust (and make sure values near 1 and 0 are not allowed to change too much in the output) and this results in an image where we have simultaneously brought out shadow and highlight detail. In 4d we show a second output image where the robust image is made with a larger $\lambda$ penalty term. Notice how the range of brightnesses has decreased (as we would expect). Finally, in FIG. 4e we show the average of 4d and 4c. FIG. 4e is an example of carrying out a type of multi-scale processing simply by changing the penalty term and averaging the results. It is also possible to choose a target dynamic range and to set the penalty term $\lambda$ accordingly. In 3b we set $\lambda$=c so that we meet a target image magnitude (which for the dynamic range compression could be defined as the difference between brightest and darkest pixels).

It is worth considering, in the context of regularisation theory, why the method works for this image enhancement problem. Suppose we think of an image as its derivatives. We know we can integrate the image to return the original (call this $I_1$). But, consider what happens if we add (say) k to all the x-derivatives down the centre of the image. In this case the reintegrated image, $I_2$ will have a step edge in the centre of the picture. And $\|I_1-I_2\|>>0$ (the two images compared pixel by pixel are very different) In this example, suppose we added k to m pixels in an nm pixel image. That is we change 1/n of the pixels (for 1000×1000 image we change 0.1% of the pixels). Yet, when we reintegrate there is a very large change: all the pixels in the right half of the image are +k brighter. This indicates that the reintegration equations (just the same as the example at the very start of this description) is unstable: a small change in the derivatives results in a large change in the recovered image. By applying the robust images method according to embodiments of the invention, the two derivative images reintegrate, more or less, to the same robust image.

Other applications include object recognition, dynamic range compression, navigation, tracking and image compression. In object recognition the colour or brightness of an object is sometimes taken as a cue for recognition. An object in shadow may be unseen in a recognition task. Making a robust image will bring out the details in the shadows (and in the highlights). Dynamic range compression is a process of mapping an input signal (with a dynamic range equal to the max minus the min signal values) to a target (usually smaller) output dynamic range. Example signals might include images but also audio. The navigation problem is similar to object recognition. An automated robotic system can only avoid objects that it can see. In tracking we wish to avoid losing a track when an object moves from a brightly lit to a dimly lit part of the scene. There is a role for image compression here because the process of making the image robust is reversible. Given a robust image (no shadows and so lower dynamic range) and given knowledge of $\lambda$ we can invert the process of making the image robust. Potentially, coding images in a small dynamic range is an easier (more efficient process) than coding HDR images (a point borne out by the literature).

Embodiments of the invention include applying the idea of making an image robust in reverse. Here we could choose $\lambda$ to be a negative number. That is, we would encourage the recovered solution to have a large norm. In carrying out this operation we have to be careful that the negative penalty term does not lead to a rank deficient matrix (which cannot be inverted). An alternate way to apply the method in reverse is to observe that (from Equation 7): $R=[D^TD+\lambda I]^{-1} D^TDQ$ implies $Q=[D^TD]^{-1} [D^TD+\lambda I]R$. Here the operator $[D^TD]^{-1} [D^TD+\lambda I]$ makes an image less robust with the larger $\lambda$ implying a less robust output. Note the operator $[D^TD]$ is not full rank and so can only be inverted if appropriate boundary conditions are made (e.g. Dirichlet or Homogeneous Neumann).

Making an image non-robust can have useful applications for example for low contrast images since it can bring out detail. In addition, since the method according to embodiments of the invention is reversible, an image can be made robust in order to compress the detail, and the robust image can be made non-robust in order to expand the detail. The detail is not lost since the process is non-destructive. Accordingly, embodiments of the invention provide advantageous non-destructive image compression functionality.

It is to be appreciated that certain embodiments of the invention as discussed above may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The disclosures in British patent application no. GB1007580.2, from which this application claims priority, and in the abstract accompanying this application are incorporated herein by reference.

REFERENCES

[1] Retinex at 40 (series of papers). In B. E. Rogowitz and T. N. Pappas, editors, *Human Vision and Electronic Imaging VII*. SPIE: the International Society for Optical Engineering, 2002.
[2] Peter J. Burt and Edward H. Adelson. The laplacian pyramid as a compact image code. pages 671-679, 1987.
[3] G. H. Golub and C. F. van Loan. *Matrix Computations*. John Hopkins U. Press, 1983.
[4] R. C. Gonzalez and P. Wintz. *Digital Image Processing*. Addison/Wesley, 2nd edition, 1987.
[5] Per Christian Hansen. *Rank-deficient and discrete ill-posed problems: numerical aspects of linear inversion*. Society for Industrial and Applied Mathematics, Philadelphia, Pa., USA, 1998.
[6] A. C. Hurlbert. *The Computation of Color*. PhD thesis, MIT Artificial Intelligence Laboratory, 1989.
[7] D. Marr. *Vision*. Freeman, 1982.
[8] William Press, Saul Teukolsky, William Vetterling, and Brian Flannery. *Numerical Recipes* in C. Cambridge University Press, Cambridge, UK, 2nd edition, 1992.
[9] B. A. Wandell. *Foundations of Vision*. Sinauer Associates, 1st edition, 1995.

The invention claimed is:

1. A method of generating output image data, comprising:
obtaining derivative data relating to a reference image,
obtaining a constraint for output image data, wherein the constraint includes minimizing the sum of:
the difference between a derivative of the output image data and the derivative data for the reference image, and
a penalty term that is the product of a constant and a magnitude of the output image data, wherein a value of the constant is inversely proportional to the magnitude of the output image data, wherein a value of the constant is inversely proportional to the magnitude of a function of the output image data; and
generating the output image data from the derivative data relating to the reference image in dependence on the constraint.

2. The method of claim 1, wherein the constraint comprises that the output image be a linear combination of a set of smooth functions that are based on the first M terms of a discrete cosine basis.

3. The method of claim 1, wherein minimizing the sum comprises minimizing the sum based on an algorithm that is selected from the group consisting of the Gauss-Seidel method and the Jacobi method.

4. The method of claim 1, wherein different values of the constant generate output image data at different scales.

5. The method of claim 1, wherein the constant is selected to have a positive value to make the output image corresponding to the output image data robust.

6. The method of claim 5, wherein the derivative data for the reference image and the penalty term are selected such that the step of minimizing the sum can be solved by a convolution function.

7. The method of claim 6, wherein the convolution function is approximated by a pair of one-dimensional separable convolution functions.

8. The method of claim 1, wherein the constant is selected to have a negative value to make the output image corresponding to the output image data non-robust.

9. The method of claim 1, further comprising receiving the reference image and computing the derivative data relating to the reference image from the reference image.

10. The method of claim 1, wherein the derivative data relating to the reference image comprises a first function of a derivative of reference image data, and wherein the reference image data comprises a second function of the reference image that is distinct from the first function.

11. The method of claim 10, wherein the first function is selected from a group including a threshold function, an attenuating function and a clip function.

12. The method of claim 10, wherein the first function of the derivative of the reference image data is the derivative of the reference image data.

13. The method of claim 10, further comprising setting the mean of the output image data to equal the mean of the reference image data.

14. The method of claim 10, wherein the second function includes a homomorphic function, and wherein the homomorphic function includes a logarithm function.

15. The method of claim 10, further comprising applying the inverse of the second function to the output image data to generate an output image.

16. The method of claim 15, further comprising using the output image in an image processing method for solving a computer vision problem, wherein the image processing method is selected from a group including dynamic range compression, tracking, navigation, and object recognition.

17. The method of claim 10, wherein the second function of the reference image is the reference image and the output image data is the output image.

18. The method of claim 10, wherein the reference image includes a vector representation of the reference image.

19. The method of claim 1, wherein the magnitude of the output image data includes a magnitude of a function of the output image data.

20. The method of claim 1, comprising:
selecting a target dynamic range for the output image data; and
setting the value of the constant to a first value is associated with the target dynamic range.

21. An image processing system comprising a first component arranged to obtain derivative data relating to a reference image,
a second component arranged to obtain a constraint for output image data, wherein the constraint includes minimizing the sum of the difference between a derivative of the output image data and the derivative data for the reference image, wherein a value of the constant is inversely proportional to the magnitude of the function of the output image data, and
a penalty term that is the product of a constant and a magnitude of the output image data, wherein a value of the constant is inversely proportional to the magnitude of a function of the output image data, and
a third component operable to receive the derivative data relating to the reference image from the first component and the constraint from the second component and to generate the output image data from the derivative data relating to the reference image in dependence on the constraint.

22. The image processing system of claim 21, comprising an image capture device operable to capture the reference image, wherein the first component is coupled to the image capture device and operable to receive the reference image from the image capture device and to calculate the derivative data relating to the reference image from the reference image.

23. The image processing system of claim 21, wherein at least one of the first, second or third components includes a processor.

24. The image processing system of claim 21, wherein the second component is arranged to minimize the sum based on an algorithm that is selected from the group consisting of the Gauss-Seidel method and the Jacobi method.

25. The image processing system of claim 21, wherein the second component is arranged to perform operations comprising:
   selecting a target dynamic range for the output image data; and
   setting the value of the constant to a first value is associated with the target dynamic range.

26. The image processing system of claim 21, wherein the constant is selected to have a positive value to make the output image corresponding to the output image data robust.

27. The image processing system of claim 26, wherein the derivative data for the reference image and the penalty term are selected such that the step of minimizing the sum can be solved by a convolution function.

28. The image processing system of claim 21, wherein the constant is selected to have a negative value to make the output image corresponding to the output image data non-robust.

29. The image processing system of claim 21, wherein the derivative data relating to the reference image comprises a first function of a derivative of reference image data, and wherein the reference image data comprises a second function of the reference image that is distinct from the first function.

30. The image processing system of claim 29, wherein the first function is selected from a group including a threshold function, an attenuating function and a clip function.

31. The image processing system of claim 29, wherein the third component is operable to set the mean of the output image data to equal the mean of the reference image data.

32. The image processing system of claim 9, wherein the second function includes a homomorphic function, and wherein the homomorphic function includes a logarithm function.

33. The image processing system of claim 29, wherein the reference image includes a vector representation of the reference image.

34. The image processing system of claim 21, wherein the magnitude of the output image data includes a magnitude of a function of the output image data.

35. A non-transitory computer readable storage medium for storing machine-executable instructions, that, when executed by a processor, cause the processor to perform operations comprising:
   obtaining derivative data relating to a reference image,
   obtaining a constraint for output image data, wherein the constraint includes minimizing the sum of the difference between a derivative of the output image data and the derivative data for the reference image, and
   a penalty term that is the product of a constant and a magnitude of the output image data, wherein a value of the constant is inversely proportional to the magnitude of a function of the output image data; and
   generating the output image data from the derivative data relating to the reference image in dependence on the constraint.

* * * * *

UNITED STATES PATENT AND TRADEMARK OFFICE
CERTIFICATE OF CORRECTION

PATENT NO. : 8,913,845 B2
APPLICATION NO. : 13/696540
DATED : December 16, 2014
INVENTOR(S) : Graham D. Finlayson It is certified that error appears in the above-identified patent and that said Letters Patent is hereby corrected as shown below:

In the claims,

In claim 1, column 9, lines 40-42, after "data," delete "wherein a value of the constant is inversely proportional to the magnitude of the output image data,".

In claim 1, column 9, lines 43-44, after "magnitude," delete "of a function".

In claim 20, column 10, line 43, after "value", second occurrence, insert -- that --.

In claim 21, column 10, line 45, after "comprising" insert -- : --.

In claim 21, column 10, lines 52-54, after "image," delete "wherein a value of the constant is inversely proportional to the magnitude of the output image data,".

In claim 21, column 10, lines 57-58, after "magnitude" delete "of a function".

In claim 25, column 11, line 16, after "value", second occurrence, insert -- that --.

In claim 35, column 12, line 23 (approx.), after "sum of" insert -- : --.

In claim 35, column 12, lines 28-29 (approx.), after "magnitude" delete "of a function".

Signed and Sealed this
Twenty-eighth Day of April, 2015

Michelle K. Lee
*Director of the United States Patent and Trademark Office*